United States Patent
Fritsch

(10) Patent No.: US 8,632,370 B2
(45) Date of Patent: Jan. 21, 2014

(54) AMPHIBIOUS VEHICLE

(75) Inventor: Antoine Fritsch, Andresy (FR)

(73) Assignee: Iguana Yachts, Brehal (FR)

( * ) Notice: Subject to any disclaimer, the term of this patent is extended or adjusted under 35 U.S.C. 154(b) by 116 days.

(21) Appl. No.: 12/997,428

(22) PCT Filed: Jun. 4, 2009

(86) PCT No.: PCT/FR2009/000658
§ 371 (c)(1),
(2), (4) Date: Jan. 31, 2011

(87) PCT Pub. No.: WO2010/000963
PCT Pub. Date: Jan. 7, 2010

(65) Prior Publication Data
US 2011/0143606 A1    Jun. 16, 2011

(30) Foreign Application Priority Data
Jun. 10, 2008   (FR) ..................... 08 03209

(51) Int. Cl.
    *B60F 3/00*        (2006.01)
(52) U.S. Cl.
    USPC ...................... 440/12.54; 440/12.5
(58) Field of Classification Search
    USPC ........ 440/12.5, 12.51, 12.52, 12.54; 114/344;
                280/43.14, 43.16, 43.17, 43.22, 43.23,
                                                280/43.24
    See application file for complete search history.

(56) References Cited

U.S. PATENT DOCUMENTS

| | | | | |
|---|---|---|---|---|
| 3,414,917 A | * | 12/1968 | Harrington | 114/344 |
| 3,618,149 A | * | 11/1971 | Christensen | 114/344 |
| 5,181,478 A | * | 1/1993 | Berardi | 440/12.54 |
| 5,570,653 A | * | 11/1996 | Gere et al. | 440/12.51 |
| 6,394,017 B2 | * | 5/2002 | Pavon et al. | 114/344 |
| 6,808,430 B1 | * | 10/2004 | March | 440/12.52 |
| 7,322,864 B2 | * | 1/2008 | Longdill et al. | 440/12.54 |
| 2002/0017229 A1 | | 2/2002 | Pavon et al. | |
| 2005/0003715 A1 | | 1/2005 | Hewitt | |

FOREIGN PATENT DOCUMENTS

| | | |
|---|---|---|
| DE | 10344957 A1 | 4/2005 |
| DE | 102004059861 A1 | 6/2006 |
| FR | 2782696 A1 | 3/2000 |
| GB | 2419326 A | 4/2006 |
| WO | 2007141515 A1 | 12/2007 |

OTHER PUBLICATIONS

International Search Report, dated Jan. 5, 2010, from corresponding PCT application.

* cited by examiner

*Primary Examiner* — Lars A Olson
(74) *Attorney, Agent, or Firm* — Young & Thompson

(57) ABSTRACT

An amphibious vehicle includes: a hull (1) having a longitudinal axis; an aquatic propulsion element; a terrestrial propulsion element (5a, 5b) mounted on arms (4a, 4b) pivoting about an axis substantially parallel to the longitudinal axis of the hull, and capable of assuming a stowed position when the vehicle moves over water using the aquatic propulsion element, and an extended position in which the vehicle can move on the ground using the terrestrial propulsion element. In the stowed position, the arms (4a, 4b) extend into cavities (3a, 3b) formed in the hull (1), and a portion of the arms (4a, 4b) defines a lid that at least partially closes the cavity (3a, 3b) in the longitudinal direction of the hull bottom (2).

16 Claims, 4 Drawing Sheets

AMPHIBIOUS VEHICLE

Figure 1A:
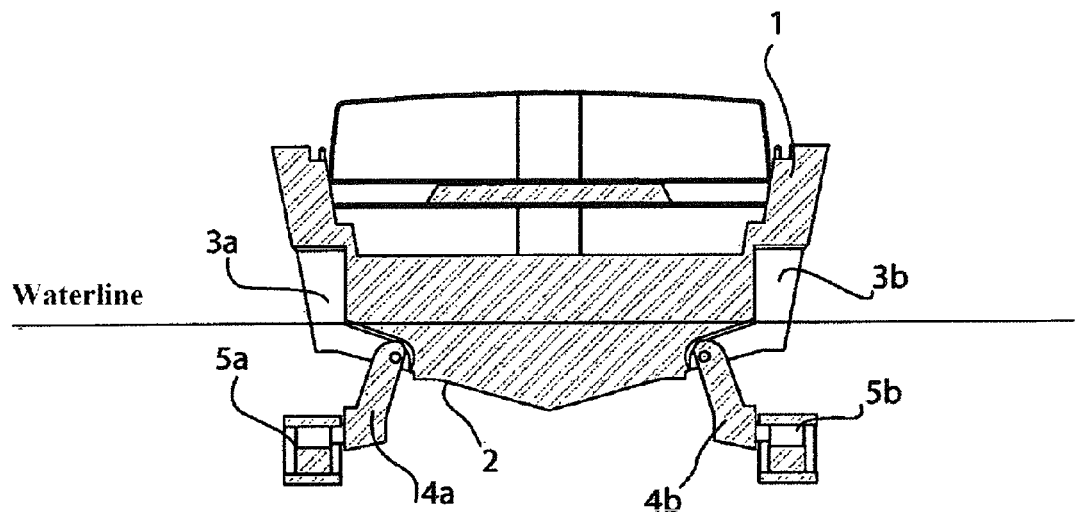

The present invention relates to an amphibious vehicle.

Amphibious vehicles provide the possibility of moving on water and on land with the same vehicle, which has great usefulness in areas not provided with harbor facilities. If the amphibious vehicle is provided with caterpillar tracks, it may further move in land areas not provided with roads, such as coastal areas.

Moving on water in a relatively efficient way requires that these vehicles be provided with a hull of hydrodynamically acceptable shapes and of course aquatic propulsion means such as a propeller, a hydrojet or a sail. The integration into this hull, further of terrestrial propulsion means, such as wheels or caterpillar tracks, is delicate. In order not to penalize the performance of the vehicle in aquatic propulsion, the fact that these means are immersed during aquatic propulsion phases and cause too significant drag should notably be avoided, for example by being retractable.

Several examples of amphibious vehicles are known for which the terrestrial propulsion means are retractable. For example, WO 2007/141515 describes an amphibious vehicle provided with caterpillar tracks and/or slidably mounted wheels along a vertical axis or pivotally mounted along a longitudinal axis. However, in the high position, these propulsion means remain very close to the water line surface and are entirely subject to marine elements (waves, swell . . . ) and therefore risk penalizing the aquatic propulsion phases. Further, this solution leads to a vehicle of great width, particularly in the case of wheels or caterpillar tracks which pivot along a longitudinal axis.

US 2005/0003715 describes an amphibious vehicle provided with pivotally mounted caterpillar tracks on the sides of the vehicle which may assume two positions, a deployed position where they may bear upon the ground and allow the vehicle to advance on land, and a folded-back position during the aquatic propulsion phases where they rest on spaces reserved for this purpose on the deck of the vehicle. In this solution, the caterpillar tracks in the folded-back position are not able to cause any drag, but they either occupy a significant portion of the deck surface, or they are maintained away from the deck surface and lead to significant widening of the vehicle.

DE 10 2004 059 861 describes an amphibious vehicle provided with wheels mounted at the base of retractable boxes. The boxes are retracted and integrated into the hull for terrestrial propulsion, and deployed for aquatic propulsion, transforming the vehicle into a catamaran. However the wheels are fixed relatively to the boxes and are therefore immersed in the aquatic propulsion phase, causing drag. Minimising this drag leads to adopting small wheels, which makes terrestrial propulsion not very performing.

The object of the invention is to solve these problems notably by providing an amphibious vehicle in which the terrestrial propulsion means do not cause the vehicle to lose its nautical qualities and/or its habitability.

For this purpose, the invention proposes an amphibious vehicle comprising:
hull having a longitudinal axis,
aquatic propulsion means,
terrestrial propulsion means mounted on arms pivoting about an axis substantially parallel to the longitudinal axis of said hull, which may assume a deployed position in which said vehicle may move on land thanks to said terrestrial propulsion means and a folded-back position used when said vehicle moves on water thanks to said aquatic propulsion means.

According to the invention, in the folded-back position, the arms by pivoting engage into cavities made in the hull and a portion of the arms forms a cover which closes the cavity in the extension of the hull bottom.

The arms which bear the terrestrial propulsion means therefore have a dual function:
a mechanical linking function between the amphibious vehicle and its terrestrial propulsion means,
a nautical function thanks to the cover which they include; in the folded-back position, the cover ensures continuity of the hull bottom, quick works and upper works, which thus keeps its nautical qualities.

In an embodiment, the amphibious vehicle includes two pivoting arms positioned symmetrically relatively to a longitudinal plane of symmetry of said vehicle, but it may also include two pairs of arms positioned in the same way.

Advantageously, in the folded-back position, said terrestrial propulsion means at least partly engage into said cavities and are entirely above the water line. The drag which occurs when the vehicle is subject to a breaker or to a bow wave is thereby minimized.

The terrestrial propulsion means may for example be caterpillar tracks or wheels mounted on the end of each arm.

Advantageously, in the folded-back position, the terrestrial propulsion means may form lateral fenders for the amphibious vehicle. Indeed, if they do not completely engage into the cavities in the folded-back position, the caterpillar tracks or the wheels include a portion which juts out from the hull, and, considering their resilient nature (rubber . . . ), they may fulfil the function of a lateral fender for the amphibious vehicle.

The aquatic propulsion means, for example a Z drive and a propeller or a hydrojet, may include a motor, for example a combustion engine.

For their part, the terrestrial propulsion means may include a hydraulic pump driven by said engine.

These hydraulic means may include at least two independent hydraulic engines, for example each actuating a caterpillar track or a train of wheels.

Alternatively, the upper walls and the walls at the back of said cavities are integral with each other and may also be pivotally mounted about an axis parallel to the pivot axis of the arms so as to be able to assume a folded-back position in which the back and upper walls close the cavities and, when said amphibious vehicle rests on its terrestrial propulsion means, a deployed position in which the deck of the vehicle is cleared laterally.

Figure 1B:
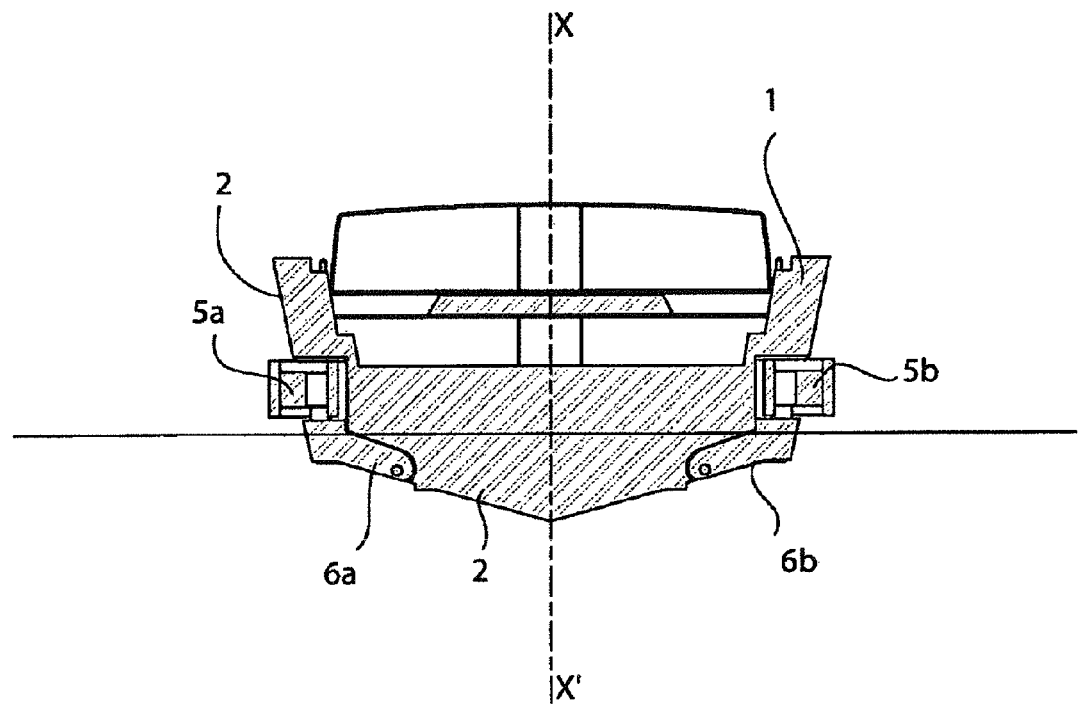
Figure 1C:
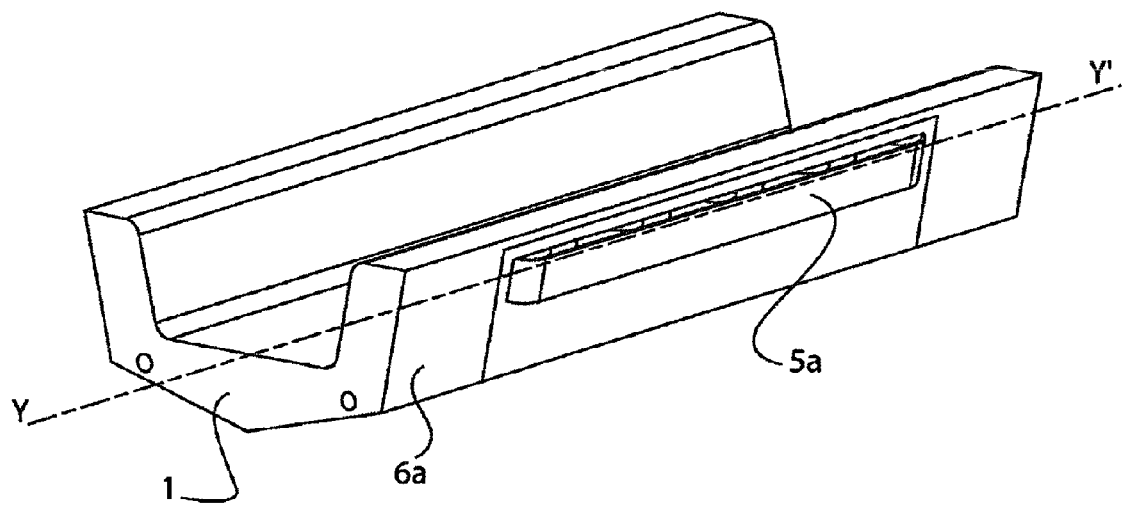
Figure 2A:
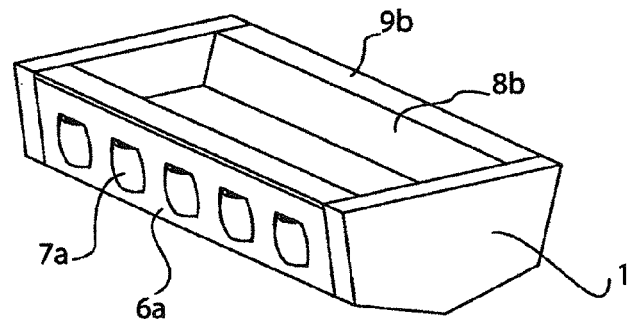
Figure 2B:
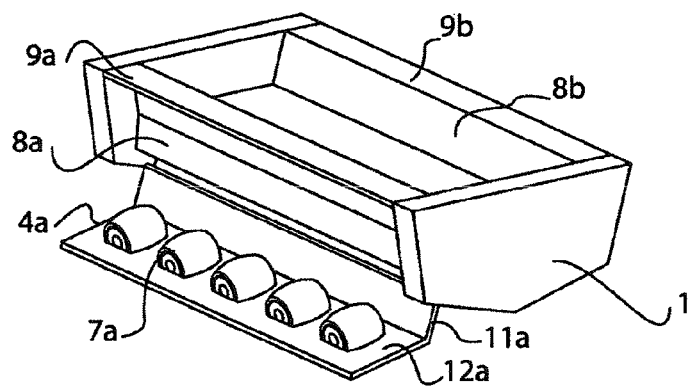
Figure 2C:
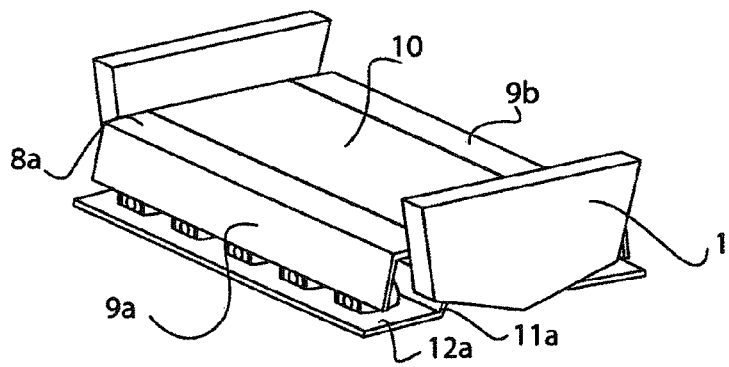
Figure 3A:
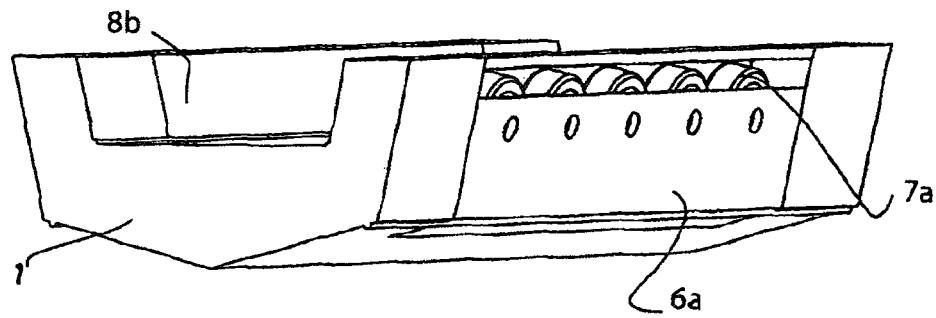
Figure 3B:
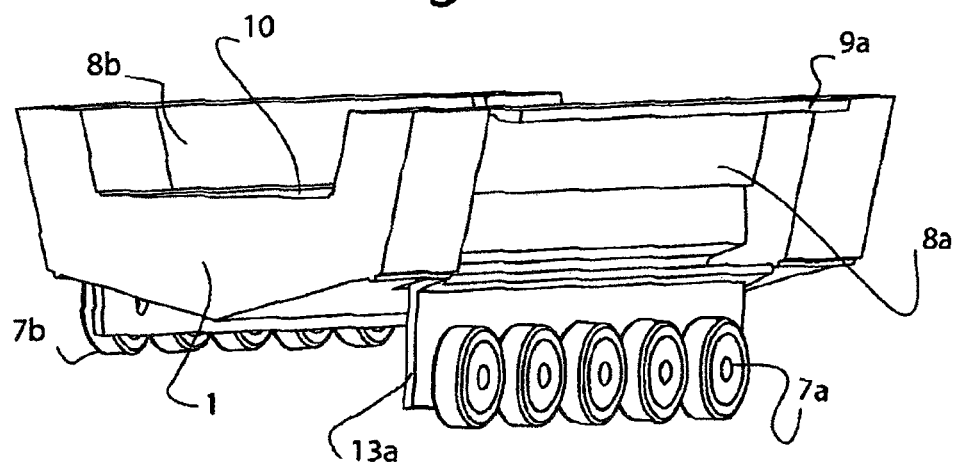
Figure 3C:
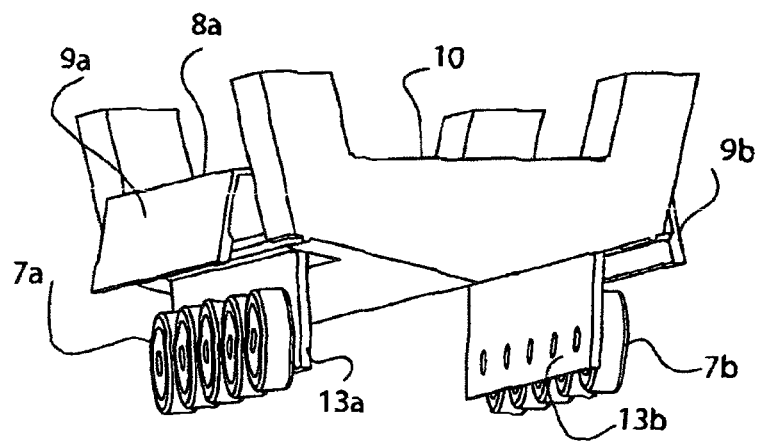

Embodiments of the invention will be described hereafter, as non-limiting examples, with reference to the appended drawings wherein:

FIGS. 1A and 1B are schematic sectional views of an embodiment of the amphibious vehicle according to the invention, the terrestrial propulsion means being deployed and folded-back, respectively, FIG. 1C is a schematic partial perspective view of the same embodiment of the amphibious vehicle, the terrestrial propulsion means being folded back, FIGS. 2A, 2B and 2C are schematic partial perspective views of another embodiment of the amphibious vehicle according to the invention, the terrestrial propulsion mean being folded back (FIG. 2A) and deployed (FIGS. 2B and 2C), FIGS. 3A, 3B and 3C are schematic partial perspective views of another embodiment of the amphibious vehicle according to the invention, the terrestrial propulsion means being folded back (FIG. 3A) and deployed (FIGS. 3B and 3C).

As illustrated by FIGS. 1A-1C, the amphibious vehicle includes a hull 1 delimiting a hull bottom 2 and cavities 3a and 3b, each comprising side partitions, an upper partition 9a and 9b as well as back partitions 8a and 8b, which are made in the flanks of the hull 1. Two arms 4a and 4b, located on either side of the plane of symmetry X-X' of the hull 1, may pivot about an axis substantially parallel to an axis Y-Y' of the hull 1 and located in the lower portion of the arms, in order to assume a deployed position and a folded-back position.

In the folded-back position, the arms 4a and 4b respectively find room in the cavities 3a and 3b. On one of their faces, they include covers 6a and 6b respectively, which at least partly close the respective cavity and are placed in the extension of the hull bottom 2. The arms 4a and 4b at their free end are bearers of caterpillar tracks 5a and 5b. In the folded-back position, these caterpillar tracks 5a and 5b at least partly find room in the cavities 3a and 3b. In this position the covers 6a and 6b ensure the continuity of the immersed portion of the hull bottom 2 and the caterpillar tracks 5a and 5b are found entirely above the waterline, so as not to sacrifice the nautical properties of the amphibious vehicle.

When the arms 4a and 4b are in the deployed position, the amphibious vehicle rests on the caterpillar tracks 5a and 5b and may move on land; the cavities 3a and 3b are then open.

Alternatively, the terrestrial propulsion means may be formed by a train of wheels 7a and 7b positioned longitudinally as illustrated in FIGS. 2A-2C and 3A-3C.

The arms 4a and 4b may be of a longitudinally elongated shape, notably when they bear caterpillar tracks or trains of wheels.

In an embodiment illustrated in FIG. 2B, the arm 4a (4b respectively) may consist of two panels, for example flat panels, 11a and 12a (11b and 12b respectively), forming an obtuse angle, the panel 11a being pivotally mounted on the hull 1, the panel 12a bearing the caterpillar tracks or the wheels. In this embodiment, the rolling axis of the caterpillar tracks or wheels is located in the extension of the panel 12a. The cover 6a is formed by the outer face of the panels 11a and 12a.

In another embodiment illustrated in FIG. 3B, the arm 4a (4b respectively) consists of a single panel 13a (13b respectively), and the rolling axis of the caterpillar tracks or wheels is orthogonal to said panel.

In another embodiment (not shown), the vehicle includes two pairs of arms and two pairs of side cavities positioned on either side of the longitudinal plane of symmetry of the vehicle. Each arm may then be bearer of a wheel and include on one of its faces a cover intended to close the respective cavity into which it folds back.

In the folded-back position, the caterpillar tracks (5a, 5b) or the wheels (7a, 7b) do not entirely penetrate into their respective cavity (3a, 3b) and considering the resilient nature of the material which makes them up (rubber . . . ), they advantageously form lateral fenders for the vehicle when it is moored to a quay.

In the alternatives illustrated in FIGS. 2C and 3C, the back partition 8a (8b respectively) and the upper partition 9a (9b respectively) of the cavity 3a (3b respectively) are integral with each other and are pivotally mounted about an axis parallel to the pivot axis of the arm 4a (4b respectively) and located in the lower portion of the back partition, at the height of the deck 10, so as to deploy outwards from the hull 1 of the vehicle. In the folded-back position, the back partitions 8a and 8b close their respective cavity 3a and 3b and therefore have to achieve a good seal with the hull 1, for example by means of a seal gasket and locking in a folded-back position. These back partitions 8a and 8b may pivot and assume a deployed position when the arms 4a and 4b have themselves already assumed a deployed position, the amphibious vehicle then resting on its terrestrial propulsion means. In this deployed position both of the arms 4a and 4b and the back partitions 8a and 8b, the deck 10 of the vehicle may be entirely clear laterally, which allows loading and facilitated unloading which may be useful for a load carrying application. Further, in this position, the back partitions 8a and 8b protect the terrestrial propulsion means regardless of what they are, and play the function of mud guards.

The invention claimed is:

1. An amphibious vehicle comprising:
   a hull (1) having a longitudinal axis (Y-Y');
   an aquatic propulsion mechanism; and
   a terrestrial propulsion mechanism (5a, 5b, 7a, 7b) mounted on suspension arms, which are configured to (4a, 4b) pivot about an axis substantially parallel to the longitudinal axis (Y-Y') of said hull, and which may assume a folded-back position used when said vehicle moves on water thanks to said aquatic propulsion mechanism and a deployed position in which said vehicle may move on land thanks to said terrestrial propulsion mechanism;
   such that, in the folded-back position, said suspension arms (4a, 4b) engage into cavities (3a, 3b) made in said hull (1) and a portion of said arms (4a, 4b) forms a cover (6a, 6b) which at least partly closes said cavity (3a, 3b) in the extension of the hull bottom (2),
   characterized in that each of said covers is integrally formed as a single piece with a respective suspension arm.

2. The amphibious vehicle according to claim 1, characterized in that it includes two pivoting suspension arms (4a, 4b) positioned symmetrically relatively to a longitudinal plane of symmetry (X-X') of said vehicle.

3. The amphibious vehicle according to claim 1, characterized in that it includes pairs of pivoting suspension arms positioned symmetrically relatively to a longitudinal plane of symmetry (X-X') of said vehicle.

4. The amphibious vehicle according to claim 1, characterized in that, in the folded-back position, said terrestrial propulsion mechanism (5a, 5b, 7a, 7b) at least partly engages into said cavities (3a, 3b) and is entirely above the waterline.

5. The amphibious vehicle according to claim 1, characterized in that said terrestrial propulsion mechanism is caterpillar tracks (5a, 5b).

6. The amphibious vehicle according to claim 1, characterized in that said terrestrial propulsion mechanism is wheels (7a, 7b).

7. The amphibious vehicle according to claim 5, characterized in that, in the folded-back position, said terrestrial propulsion mechanism (5a, 5b, 7a, 7b) forms lateral fenders for the amphibious vehicle.

8. The amphibious vehicle according to claim 1, characterized in that said aquatic propulsion mechanism includes a motor.

9. The amphibious vehicle according to claim 8, characterized in that said terrestrial propulsion mechanism (5a, 5b, 7a, 7b) is driven by a hydraulic mechanism including a hydraulic pump driven by said motor.

10. The amphibious vehicle according to claim 9, characterized in that said hydraulic mechanism includes at least two independent hydraulic engines.

11. The amphibious vehicle according to claim 1, characterized in that back walls (8a, 8b) and the upper walls (9a, 9b) of said cavities (3a, 3b) are integral with each other and pivotally mounted about an axis parallel to the pivot axis of said suspension arms (4*a*, 4*b*) so as to be able to assume a folded-back position in which back and upper walls close said cavities (3*a*, 3*b*) and, when said amphibious vehicle rests on its terrestrial propulsion mechanism, a deployed position in which the deck of the vehicle (10) is clear laterally.

12. The amphibious vehicle according to claim 2, characterized in that, in the folded-back position, said terrestrial propulsion mechanism (5*a*, 5*b*, 7*a*, 7*b*) at least partly engages into said cavities (3*a*, 3*b*) and is entirely above the waterline.

13. The amphibious vehicle according to claim 2, characterized in that said terrestrial propulsion mechanism is caterpillar tracks (5*a*, 5*b*).

14. The amphibious vehicle according to claim 2, characterized in that said terrestrial propulsion mechanism is wheels (7*a*, 7*b*).

15. The amphibious vehicle according to claim 6, characterized in that, in the folded-back position, said terrestrial propulsion mechanism (5*a*, 5*b*, 7*a*, 7*b*) forms lateral fenders for the amphibious vehicle.

16. The amphibious vehicle according to claim 2, characterized in that back walls (8*a*, 8*b*) and the upper walls (9*a*, 9*b*) of said cavities (3*a*, 3*b*) are integral with each other and pivotally mounted about an axis parallel to the pivot axis of said suspension arms (4*a*, 4*b*) so as to be able to assume a folded-back position in which back and upper walls close said cavities (3*a*, 3*b*) and, when said amphibious vehicle rests on its terrestrial propulsion mechanism, a deployed position in which the deck of the vehicle (10) is clear laterally.

* * * * *

UNITED STATES PATENT AND TRADEMARK OFFICE
CERTIFICATE OF CORRECTION

PATENT NO.       : 8,632,370 B2                                        Page 1 of 1
APPLICATION NO. : 12/997428
DATED            : January 21, 2014
INVENTOR(S)      : Antoine Fritsch It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 166 days.

Signed and Sealed this

Twenty-second Day of September, 2015

Michelle K. Lee
*Director of the United States Patent and Trademark Office*